United States Patent [19]

Caumartin et al.

[11] 4,035,560

[45] July 12, 1977

[54] METHOD OF POLYMERIZING OLEFINS IN A FLUIDIZED BED

[75] Inventors: Francois Caumartin; Laszlo Havas, both of Martigues, France

[73] Assignee: Naphtachimie, Paris, France

[21] Appl. No.: 689,599

[22] Filed: May 24, 1976

[30] Foreign Application Priority Data

May 27, 1975 France .............................. 75.16515

[51] Int. Cl.$^2$ ..................... C08F 2/34; C08F 4/02; C08F 4/60; C08F 10/00
[52] U.S. Cl. .............................. 526/124; 526/129; 526/156; 526/159; 526/169; 526/901; 526/904; 526/905; 526/907
[58] Field of Search .......... 526/124, 129, 156, 159, 526/169, DIG. 901, DIG. 904, DIG. 905, DIG. 907

[56] References Cited

U.S. PATENT DOCUMENTS

| | | | |
|---|---|---|---|
| 3,002,963 | 10/1961 | Czenkusch et al. | 526/901 |
| 3,023,203 | 2/1962 | Dye | 526/901 |
| 3,152,106 | 10/1964 | Mostert | 526/159 |
| 3,701,766 | 10/1972 | Delbouille et al. | 526/904 |
| 3,922,322 | 11/1975 | Dormenval et al. | 526/904 |
| 3,954,909 | 5/1976 | Havas et al. | 526/904 |

*Primary Examiner*—Alan Holler
*Attorney, Agent, or Firm*—McDougall, Hersh & Scott

[57] ABSTRACT

The polymerization of olefins to form polymers having a molecular weight greater than 50,000 wherein the polymerization is carried out in the presence of a catalyst component formed of a compound of a transition metal of the sub-groups IVa, Va and VIa, and a co-catalyst component of at least one organo-metallic compound of a metal from groups II and III of the periodic table, in which the co-catalyst is in the form of a liquid which is separately introduced into the reaction vessel on a carrier formed of an inert porous powder which is impregnated with the co-catalyst.

11 Claims, No Drawings

METHOD OF POLYMERIZING OLEFINS IN A FLUIDIZED BED

The invention relates to a method of polymerizing olefins in a fluidized bed.

In accordance with the practice of this invention, the olefins in the gaseous state are directly converted into solid polymers or copolymers having a molecular weight generally higher than 50,000. The method of the invention is particularly applicable to the polymerization of ethylene along or mixed with other olefins.

It is known to polymerize ethylene from a gaseous mixture containing ethylene in a reaction vessel in which the solid polymer, in course of formation, is kept in the fluidized state by means of an upward stream of the gaseous mixture. At the outlet of the reaction vessel, the gaseous mixture is generally cooled before being recycled into the reaction vessel with an additional quantity of ethylene. Polymerization is carried out in the presence of a catalytic system comprising a catalyst formed by a compound of a transition metal, such as a solid compound of trivalent titanium, and a co-catalyst constituted by an organic compound of a light metal, generally a liquid organo-aluminum compound.

In order to obtain an active catalytic system, these two components are contacted either before they are introduced into the polymerization reaction vessel or within this vessel. This second technique is particularly recommended when the catalyst is constituted of a solid, since the mixing of such a catalyst with a liquid co-catalyst is difficult to achieve. However, in order to bring the co-catalyst rapidly into contact with the catalyst, the direct introduction of a liquid co-catalyst into the polymerization reaction vessel has only been envisaged as a practical step in the case of co-catalysts that are sufficiently volatile rapidly to vaporize in the gaseous mixture present in the reaction vessel and therefore to enter into contact with the catalyst. For this reason diethyl aluminum chloride is one of the co-catalysts most frequently recommended. However, the use of co-catalysts of this type is accompanied by difficulties inherent in the volatility of these compounds; they are in fact carried out from the reaction vessel with the gaseous mixture leaving the vessel, and this results in rapid reduction in the rate of polymerization. The co-catalysts carried out from the reaction vessel are furthermore likely to condense in the cold portions of the circulatory duct through which the gases pass and are thus likely to cause polymerization to take place outside the reaction vessel while in contact with fine particles of the catalyst which may likewise be entrained by the gaseous mixture.

It has now been found that it is possible to polymerize olefins in a fluidized bed in contact with solid catalysts and low-volatility liquid co-catalysts, the co-catalyst being introduced separately from the catalyst into the polymerization reaction vessel on a carrier constituted by an inert porous powder impregnated with the co-catalyst.

The invention is therefore concerned with the production of polymers having a molecular weight generally higher than 50,000 from olefins of the formula $CH_2 = CHR$, wherein R is a hydrogen atom or an alkyl radical having up to 8 carbons atoms, in a polymerization reaction vessel in which the polymer, in course of formation, is kept in a fluidized state by an upward stream of gaseous mixture containing the olefin or olefins to be polymerized, in the presence of a catalyst system incorporating a catalyst constituted by a solid containing at least one compound of a transition metal from the sub-groups IVa, Va or VIa of the periodic table, and a co-catalyst constituted by at least one organo-metallic compound of a metal from group II or III of the periodic table, which compound is liquid under the polymerization conditions and the vapor tension of which is lower than 1 mm of mercury at 80° C, the co-catalyst being introduced into the polymerization reaction vessel on a carrier formed of an inert porous powder impregnated with this co-catalyst.

The method of the invention is preferably applied to the production of polyethylene or to the production of copolymers of ethylene and other olefins of the formula $CH_2 = CHR$ mentioned above.

The co-catalyst used in the method of the invention is preferably constituted of liquid organo-aluminum compounds having the general formula $AlR'_xY_{3-x}$, wherein R' represents an alkyl group having 4 to 20 carbon atoms, Y an atom of hydrogen or of a halogen, preferably chlorine, and $x$ a whole number or a fraction of from 1 to 3. The co-catalyst is advantageously introduced into the reaction vessel in quantities such that the atomic ratio, i.e. the ratio of the aluminum of the co-catalyst to the transition metals from the sub-groups IVa, Va and VIa forming the catalyst, is between 0.1 and 50.

The porous powder by which the co-catalyst is carried is constituted of solid particles, the mean diameter of which is between 10 microns and 1 mm, and the porosity of which is such that the proportion of voids therein is at least 10%. The porous powder may be selected from solid inorganic substances that are substantially inert under polymerization conditions and do not react either with the olefins or the components of the catalytic system. The porous powder may for example be formed of particles of dehydrated alumina, silica, silicates of metals such as aluminum and/or magnesium, and of calcium carbonate and/or magnesium carbonate. Preferably, however, the porous powder is selected from solid organic substances that are stable under the polymerization conditions. Polyolefin powders, for example, are particularly suitable. In particular they may be constituted of the polymer prepared by the methods of the invention. Since the co-catalyst reacts with water, it is preferred to use a porous powder that is substantially dry so as to avoid losses of co-catalyst.

The porous powder may be impregnated with co-catalyst by mechanical mixing, for example, in a mixing machine of the screw of blade type, or by fluidization with the aid of a gas until a powder that has a dry appearance and flows readily is obtained. Depending upon their nature, the porous powders can be impregnated with widely varying quantities of co-catalyst, and the proportion by weight of co-catalyst in relation to the powder may vary, for example, between 0.5 and 5%. This proportion is not however a critical feature of the invention.

As heretofore mentioned, the catalytic system also includes a catalyst containing a compound of a transition metal from the sub-groups IVa, Va and VIa of the periodic table. These transition metals from the sub-groups VIa, Va or VIa of the periodic table include titanium, vanadium, chromium, zirconium, niobium, molybdenum, hafnium, tantalum, tungsten and, by extension, thorium and uranium.

The transition metal compound may be selected in particular from the solid compounds of trivalent titanium having the general formula $TiX_{3-m}(OR'')_m$, in which X represents an atom of halogen, generally chlorine, R'' an alkyl radical containing 2 to 8 atoms, and $m$ a whole number or a fraction of from 0 to 3. These trivalent titanium compounds are, at present, obtained by the reduction, by means of organo-aluminum compounds for example, of tetravalent titanium compounds of the formula $TiX_{4-n}(OR'')_n$, X and R'' having the same meanings as above, and $n$ being a whole number or fraction between 0 to 4. The compounds of the formula $TiX_{4-n}(OR'')_n$, in which $n$ is other than 0 and 4, can be obtained from calculated quantities of a titanium tetrahalogenide of the formula $TiX_4$ and of an alkyl tetratitanate of the formula $Ti(OR'')_4$, by a functional interexchange reaction which may be expressed as follows:

$$4-n/4\ TiX_4 + n/4\ Ti(OR'')_4 \rightarrow TiX_{4-n}(OR'')_n$$

The transition metal compound is preferably formed of a solid mixed compound of transition metal and magesium, and this compound can be obtained for example by reacting a tetravalent titanium compound with an organo-magnesium compound. The mixed compounds of this type, in fact, generally display great catalytic activity in the polymerization of olefins.

The catalyst may be constituted by a solid compound of a transition metal, such as one of the titanium compounds heretobefore mentioned, or it may be associated with a solid carrier constituted for example of granules of silica, alumina or magnesia, on which the transition metal compound is desposited or fixed. The catalyst may also be formed of a prepolymer obtained by preliminary polymerization of one or more olefins in an inert liquid, such as an aliphatic hydrocarbide, and in the presence of a transition metal compound, such as that defined above, and of a co-catalyst, such as an organo-aluminum compound. Prepolymerization is arrested after the formation of a moderate quantity of polymer, usually between 1 to 500 g per milliatomgramme of transition metal of catalyst. After separation of the liquid in which the prepolymer has been prepared, the prepolymer, which includes the remaining transition metal compound, may then be used directly as a solid having catalytic activity. It is however preferable, before using the prepolymer in the method of the invention, to subject it to one or more extractions by means of solvent, such as an aliphatic hydrocarbon, so as to create porosity within the granules of the prepolymer. This porosity makes it easier for the olefins to reach the catalytic sites.

The polymer present in the polymerization reaction vessel is maintained in the fluidized state in an upward stream of the gaseous mixture containing the olefin or olefins to be polymerized and hydrogen in proportions by volume which may be as high as 90% of that of the gaseous mixture. The latter is advantageously constituted, on the one hand, of the gaseous mixture that issues from the reaction vessel and is recycled and, on the other hand, of and additional quantity of the olefin or olefins to be polymerized, which quantity is introduced into the circulatory system in which the reaction takes place.

The speed of upward travel to be imparted to the gaseous mixture, in order to keep the polymer present in the reaction vessel in the fluidized state, will depend upon the physical parameters of the polymer and the gaseous mixture, the main parameters being the particle-size of the polymer, the specific mass of the polymer and the viscosity and specific mass of the gaseous mixture; flow rates of upward travel in the order of several decimeters per second are usually employed.

In the reaction vessel, the temperature is maintained at a level high enough to ensure that polymerization proceeds rapidly, but this temperature should not be so close to the softening temperature of the polymer so as to cause the formation of polymer agglomerates. In the production of polyethylene, the temperature is generally between 30° and 115° C. The temperature is maintained at the required level in the reaction vessel preferably by cooling the gaseous mixture recycled from the reaction vessel. thereby to enable the calories producing during polymerization to be removed.

The partial pressure to which the olefin or olefins to be polymerized in the reaction vessel are subjected will depend upon the nature of the olefins and upon the temperature obtaining in the apparatus and are regulated so as to prevent the olefins from liquefying in the coldest portion of the circulatory system. In practice, this risk exists only with olefins other than ethylene. When ethylene is used as the starting material of polymerization, temperatures are maintained at levels higher than the critical temperatures for ethylene, i.e. near 10° C, the total pressure then usually being between 1 and 40 bars.

The gaseous mixture is in contact with the catalyst, present in the reaction vessel, only during a limited period of time, generally less than a few dozen seconds. Thus, only a fraction of the olefin or olefins introduced into the reaction vessel is polymerized therein, and consequently it is in practice necessary to recycle, into the reaction vessel, the gaseous mixture that issues therefrom. To prevent the gaseous mixture from carrying away particles of polymer of catalyst at the outlet of the reaction vessel, the upper portion of the vessel may be provided with what is known as a tranquillization chamber having a cross-section greater than that of the reaction vessel. In this chamber, the rate of flow of upward travel of the gaseous mixture falls below that in the reaction vessel and this enables the entrained polymer particles or catalyst particles to drop back into the reaction vessel. The particles entrained by the gaseous mixture may also be separated in a cyclone and may be returned to the reaction vessel, preferably to the lower part thereof. Since the polymerization of olefins is exothermic, it is desirable to eliminate the heat produced so as to maintain a constant temperature in the reaction vessel. Removal of this heat is preferably achieved by causing the gaseous mixture that is to be recycled to circulate in a heat-exchanger located outside the reaction vessel.

The method of polymerizing olefins in accordance with the invention may also be used when several fluidized bed reaction vessels are arranged in series. In this case, only part of the polymerization is carried out in each reaction vessel, and the polymer, in course of formation, is circulated from the first reaction vessel to the last. In a modified arrangement, certain reaction vessels may be arranged in parallel so that the polymer, in course of formation, and issuing from one reaction vessel, supplies two or more secondary reaction vessels.

The finished polymer may be discharged from the reaction vessel in which it is produced, by means of various mechanical systems. One discharge means involves providing the lower part of this reaction vessel with an orifice which can be closed and which communicates with an enclosure maintained at a lower pressure than in the reaction vessel. Uncovering of the orifice, during a predetermined period, enables the required quantity of polymer to be removed from the reaction vessel into this enclosure. When the opening has been closed again, all that is then required is to connect the enclosure with the exterior in order to move the polymer.

The method of the invention is preferably used in such a way that the operating conditions of the reactor or reactors are substantially constant. This mode of operation may be achieved in practice by circulating, in each reaction vessel, a gaseous mixture having substantially constant properties and mainly constituted by the recycled gaseous mixture.

In has been observed that, despite the low volatility of the co-catalyst used in the method of the invention, polymerization proceeds in a satisfactory manner. This was unexpected since the co-catalyst situated within the porous particles of the carrier is not in direct contact with the catalyst. This results runs counter to the present theories on this type of polymerization. Apart from the advantage obtained by the use of low-volatility co-catalysts that are not in danger of being carried over to the polymerization reaction vessels through the exterior gas-circulating system, the invention also enables reduction in the risk of localized overheating in the polymerization reaction vessels. This advantage is particularly desirable when use is made of catalysts having high activity such as the mixed catalysts based on magnesium and transition metals, heretofore described.

EXAMPLE 1 a. Preparation of a catalyst

First, n-butyl magnesium chloride was prepared in a 5 liter stainless steel reaction vessel provided with mechanical stirring means, a reflux refrigerant and a heating or cooling means embodying circulating a fluid in a jacketed vessel. The following were introduced into the reaction vessel, maintained under a nitrogen atmosphere and at ambient temperature (25° C):

21.9 g (900 m. at.g) of powdered magnesium,
600 ml of dry n-heptane,
83.3 g (900 m.mols) of n-butyl chloride, and
one iodine crystal.

The reaction medium was heated to 75° C, and the reaction was started up and was continued under these conditions for 2 hours. When the reaction was complete, a suspension of 900 m. mols of n-butyl magnesium chloride in n-heptane was obtained.

Still in a nitrogen atmosphere, the suspension of n-buty magnesium chloride was heated to 75° C, and over a period of 2 hours a solution of 57 g (300 m.mols) of titanium tetrachloride and 83.3 g (900 m.mols) of n-butyl chloride in 350 ml of n-heptane was gradually introduced by means of a metering pump. After introduction of the solution was completed, the reaction medium was maintained at 75° C for 1 hour, with stirring.

The brown-black precipitate obtained was washed several times with n-heptane. The composition of the dry catalyst was as follows (% by weight):

Ti : 8.3 — Mg: 18.2 — Cl: 73.5.

b. Polymerization of ethylene

The operation was carried out in a fluidized bed reaction vessel in the form of a 15 cm diameter steel tube provided at the top with a tranquillization chamber; the total height of the reaction vessel was 1 meter. The fluidizing grid was formed of a plate made of fritted stainless steel. The reaction vessel was kept at a constant temperature by means of a jacket through which a refrigerating liquid was circulated.

The reaction vessel contained 1 kg of a polyethylene powder which has been impregnated beforehand with 30 g of tri n-octyl aluminum, the vapor-tension of which, at 80° C, was considerably less than 1 mm of mercury (not measurable). The powder was kept in the fluidized state by an upward stream of gas moving at a speed of 15 cm/sec.; this gas was formed of a mixture of 50% by volume of ethylene and 50% by volume of hydrogen. 10 g of the catalyst of Example 1a were introduced into the reaction vessel. After 6 hours operation at 80° C at atmospheric pressure, it was found that 610 g of polymer had formed, the weight of the powder being 1650 g. During the test no lumping or formation of polymer agglomerates occured.

EXAMPLE 2

By way of comparison, the test described in Example 1 was repeated, but the tri n-octyl aluminum was replaced by an equivalent molecular quantity of diethyl aluminum chloride, the vapor tension of which at 80° C was 9 mm of mercury. Polymerization was observed to start up, but is slowed down rapidly and stopped after 2 hours. It was found that only 70 of polymer were formed.

EXAMPLE 3

Example 1 was repeated except that polymerization proceeded at a total pressure of 20 bars, and only 20 g of tri-n-octyl aluminum were used. After polymerizing for 2 hours, it was found that 1900 g of polyethylene were formed.

EXAMPLE 4

By way of comparison, the test described in Example 3 was repeated, but the tri-n-octyl aluminum was replaced by an equivalent molecular quantity of diethyl aluminum chloride. After 2 hours, it was found that polymerization had stopped and that 350 g of polymer had formed, part of this being in the form of agglomerates. The presence of encrustations adhering to the walls was also observed.

EXAMPLE 5

The same operating conditions as in Example 3 were used, but the tri-n-octyl aluminum was replaced by an equivalent molecular quantity of tri n-tetradecyl aluminum, the vapor-tension of which at 80° C was considerably less than 1 mm of mercury (not measurable).

After 2 hours of polymerization, it was found that 1800 g of polyethylene had formed.

EXAMPLE 6

The test described in Example 3 was repeated, but using a gaseous mixture made up of 20% by volume of ethylene and 80% by volume of hydrogen, at a total pressure of 10 bars. After 10 hours of polymerization it was found that 500 g of polymer had formed.

We claim:

1. A method of producing polymers having a molecular weight generally greater than 50,000 by polymerization of olefins having the formula $CH_2 = CHR$, in which R is a hydrogen atom or an alkyl radical having from 1 to 8 atoms, in which polymerization the polymer in the course of formation is maintained in a fluidized state by an upward stream of a gaseous mixture containing the olefin or olefins to be polymerized in the presence of a catalytic system formed of a catalyst component in the form of a solid comprising at least one compound of a transition metal from the sub-groups IVa, Va and VIa of the periodic table, and a co-catalyst component formed of at least one organo-metallic compound of a metal of groups II and III of the periodic table, said latter compound being liquid under polymerization conditions and of low volatility, the improvement comprising introducing to co-catalyst component separate and apart from the catalyst component into the polymerization reaction vessel on a carrier formed of an inert porous powder impregnated with co-catalyst.

2. A method as claimed in claim 1 in which the co-catalyst has a vapor tension below 1 mm of mercury at 80° C.

3. A method as claimed in claim 1 in which the co-catalyst is formed of one or more liquid organo-aluminum compounds of the general formula $AlR'_x Y_{3-x}$, in which $R'$ represents an alkyl group having 4 to 20 carbon atoms, Y an atom of hydrogen or of a halogen, and $x$ is a whole number of from 1 to 3.

4. A method as claimed in claim 3 in which the halogen is chlorine.

5. A method as claimed in claim 3 in which the co-catalyst is employed in an amount such that the atomic ratio of aluminum of the co-catalyst to transition metal of the catalyst is within the range of 0.1 to 50.

6. A method as claimed in claim 1, in which the porous powder carrying the co-catalyst is in the form of the solid particles, the mean diameter of which is between 10 microns and 1 mm, and the porosity of which is such that the proportion of voids is at least 10%, 7. A method as claimed in claim 1, in which the porous powder carrying the co-catalyst is in the form of a solid inorganic substance selected from the group consisting of dehydrated alumina, silica, an aluminum silicate, a magnesium silicate, calcium carbonate and magnesium carbonate, 8. A method of claimed in claim 1, in which the porous powder carrying the co-catalyst is in the form of a polymer powder.

9. A method as claimed in claim 8 in which the polymer is a polyolefin.

10. A method as claimed in claim 1, in which the catalyst is a compound of titanium.

11. A method as claimed in claim 1, in which the polymerized olefin is mainly ethylene, polymerization being carried out by starting with a gaseous mixture which may contain up to 90% by volume of hydrogen, the pressure being between 1 and 40 bars and the temperature between 30° and 115° C.

* * * * *

UNITED STATES PATENT OFFICE
CERTIFICATE OF CORRECTION

Patent No. 4,035,560          Dated July 12, 1977

Inventor(s) Francois Caumartin and Laszlo Havas

It is certified that error appears in the above-identified patent and that said Letters Patent are hereby corrected as shown below:

Claim 1, line 5 before "atoms" insert "carbon"

Signed and Sealed this

Twenty-seventh Day of September 1977

[SEAL]

Attest:

RUTH C. MASON
Attesting Officer

LUTRELLE F. PARKER
Acting Commissioner of Patents and Trademarks